Feb. 12, 1935.  R. R. DOWNIE  1,990,587
SKIMMER SCOOP
Filed Sept. 30, 1933
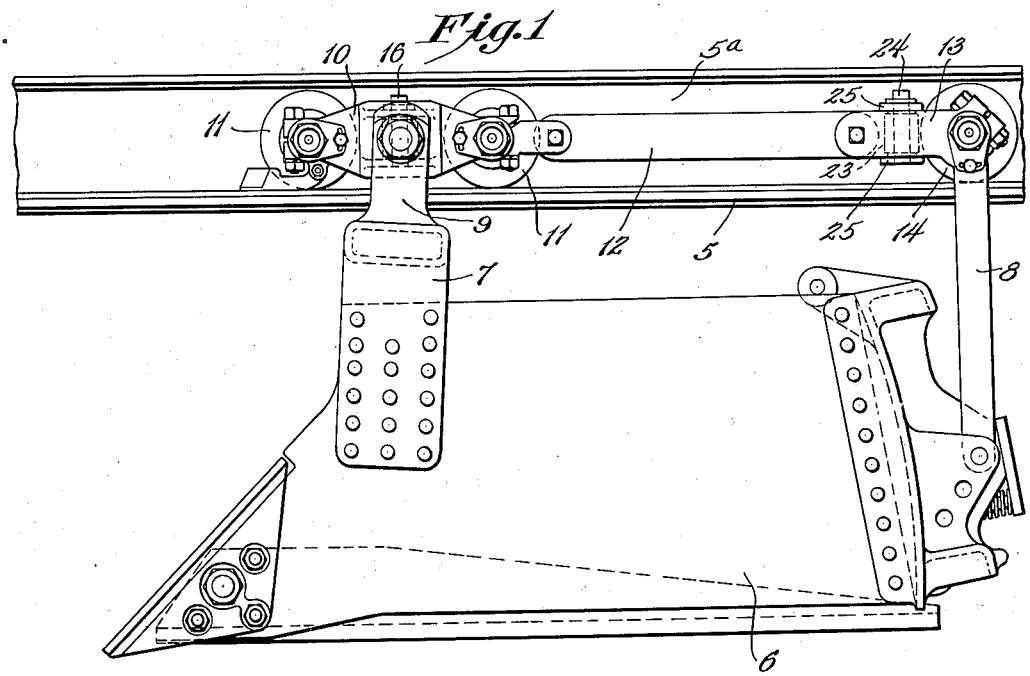
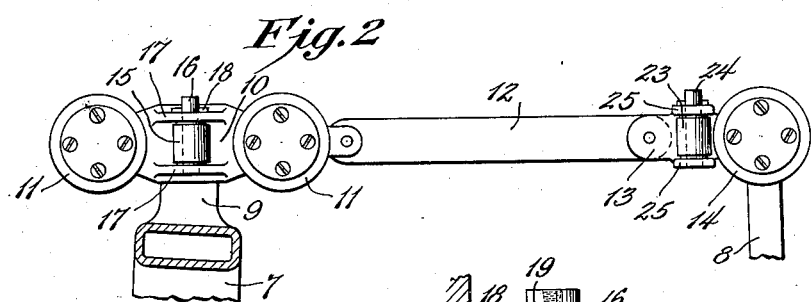
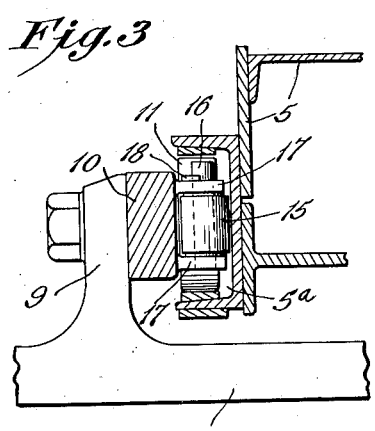
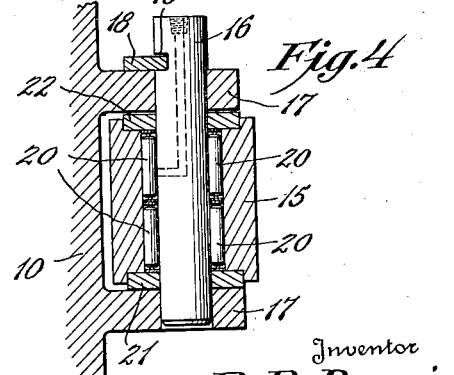
Inventor
R. R. Downie
By Philip P. Siggers
Attorney Patented Feb. 12, 1935

1,990,587

UNITED STATES PATENT OFFICE 1,990,587

SKIMMER SCOOP

Robert Rex Downie, Beaver Falls, Pa., assignor to Keystone Driller Company, Beaver Falls, Pa., a corporation of Pennsylvania Application September 30, 1933, Serial No. 691,713

4 Claims. (Cl. 214—102)

This invention relates to skimmer scoops and effects certain improvements over the skimmer scoop disclosed in Patent No. 1,536,390 dated May 5, 1925, as more particularly pointed out in the present specification describing a preferred embodiment of the invention.

In the accompanying drawing forming a part of this specification,—

Fig. 1 is a side elevation of the improved skimmer scoop shown carried upon a boom, only part of which is shown;

Fig. 2 is a fragmentary elevation showing part of the scoop carrying mechanism viewed from the boom side thereof, the bail being shown in section;

Fig. 3 is a fragmentary cross-section on an enlarged scale showing one of the guide rollers and adjacent parts; and Fig. 4 is a vertical section on a still larger scale through the guide roller of Fig. 3.

Referring particularly to the drawing, there is shown a boom 5 which (as is known in the art and hence requires no illustration) consists of two spaced beams rigidly secured together and providing trackways for the supporting rollers of a skimmer scoop. The scoop per se (not all of which is shown) is designated by 6, and is supported by a bail 7 extending crosswise over its top at the forward or digging end, also by a pair of links 8 (only one being shown) adjustably connected to the rear end of the scoop.

Extending upwardly from and preferably integral with the bail 7 are two arms 9 which are spaced apart sufficiently to straddle the boom. Centrally pivoted on the arms 9 are the equalizing roller carriers 10 on the ends of which are rollers 11 which travel along the trackways 5a provided by the boom. While the trackways 5a are shown as extending along the sides of the boom, obviously they could be provided along the top and bottom of the boom, as is known in the art. Links 12 are connected at their forward ends to the equalizing roller carriers 10 and extend rearwardly along the trackways for connection with roller carriers 13 on which the rear rollers 14 are rotatably mounted. The upper ends of links 8 are also connected to the rear roller carriers 13.

The parts so far described are essentially the same as the construction disclosed in the aforesaid Patent No. 1,536,390.

In the operation of a skimmer scoop, the scoop is pulled along the boom into the earth or other material being excavated by means of a hauling line (not shown) attached to the scoop. Elevation of the boom is accomplished by a hoisting line (not shown), and side swinging of the boom is effected by a third line or other power-actuated mechanism, to discharge the spoil gathered by the scoop.

The scoop is moved backwardly preferably by the action of gravity, which is effective when the boom is elevated a few feet. During excavating, the major normal forces transmitted to the boom are generally vertical, but both hoisting and hauling efforts against eccentric or unbalanced resistances produce severe boom-twisting and laterally deflecting reactions. Eccentric or unbalanced resistances arise whenever (1) either the hauling effort or the hoisting effort is resisted by an obstacle or relatively hard material at one side of the forward or cutting edge of the scoop; also (2) whenever the center of gravity of the load in the scoop is to one side of the medial vertical plane of the scoop; also (3) whenever the scoop is swung by power while gathering material, as frequently occurs in the cleaning up of a cut. Prior to this invention, no durable means have been provided in roller-mounted scoops for the transmission of these twisting and laterally deflecting forces.

Mounted on each equalizing roller carrier 10 is a guide roller 15 rotatable on a vertical pin 16 which is held by lugs or ears 17 projecting laterally from carrier 10. A locking piece or key 18 secured to the upper ear 17 by a screw (not shown) and passed through a notch 19 in the side of pin 16 prevents longitudinal movement of said pin, yet permits removal of the pin if the guide roller or its bearings 20 are to be repaired or replaced. Disks 21, 22 close the ends of the guide rollers and retain the grease or oil and also serve as spacers. The peripheries of the guide rollers extend beyond the ends of ears 17 and also lie closer to the boom than the side faces of the scoop-carrying rollers, so that any reaction tending to deflect the scoop laterally or to twist it on the boom is transmitted directly to the boom through the guide rollers and not through the scoop-supporting rollers. The guide rollers, their bearings and their supports are of heavy construction, so that the severest reversing stresses will be transmitted without breakage.

It will be observed that the guide rollers 15 rotate on vertical axes which lie in the vertical plane passing through the pivots of the equalizing roller carriers 10. Thus the guide rollers 15 are midway between the ends of carriers 10 and are located at the axis of oscillation of said carriers, so that there is no rocking movement, and so that both rollers 11 are held out of contact with the webs of the boom.

Located to the rear of the scoop-carrying structure are two additional guide rollers 23 rotatable on pins 24 secured in lugs or ears 25 projecting inwardly from each rear roller carrier 13. Guide rollers 23 are exactly like guide rollers 15 and hence need no further description. Preferably guide rollers 23 are between the rear ends of links 12 and the rear rollers 14, although they could be otherwise located, and they are substantially in contact with the webs of the boom to prevent contact of the side faces of rear rollers 14 with said webs.

The invention attains a number of important results. First, the force effective upon the work is increased by a material reduction in the friction between the scoop-supporting means and the boom, whenever the work is eccentrically engaged by the scoop. Second, the abrasion or wear on the boom webs is greatly diminished and hence the life of a boom is greatly prolonged. Third, the life of the scoop-carrying rollers is considerably increased. Fourth, (with a two-power-line control) the scoop "drifts" or runs back much more rapidly, and hence the boom need not be elevated so high to effect backward running, which results in a saving in power and a quicker operating cycle.

While the preferred embodiment of the invention is shown used with a boom having trackways or channels on the sides, obviously it could be used with booms having channels on the top and bottom of the boom, or on the bottom alone in combination with flanged main supporting rollers; hence the claims are not to be considered as limited to trackways located on the outside of the boom between the top and bottom thereof.

Obviously the invention may be embodied in several forms not shown or described.

Having described one embodiment of my invention, what I claim as new and desire to secure by Letters Patent is:

1. In combination with a skimmer scoop of the type having a pair of rollers on each side of the boom supporting the forward end of the scoop and a single roller on each side of the boom supporting the rear end of the scoop, a roller mounted on a vertical axis between each pair of forward rollers; another roller also on a vertical axis slightly forward of each rear roller; and means carried by the scoop for immovably positioning all said rollers having a vertical axis so that their peripheries are permanently closer to the webs of the boom than the side faces of the scoop-supporting rollers.

2. A skimmer scoop comprising, in combination, a scoop; a bail attached to and extending crosswise of and above the scoop; a pair of equalizing roller carriers pivotally mounted on the bail to swing in vertical planes about a common horizontal axis which is above the bail; a pair of rollers on the ends of each equalizing roller carrier; a link extending rearwardly from each equalizing roller carrier; a rear roller carrier connected to the rear end of each link; a roller on each rear roller carrier; all of said rollers being freely rotatable about horizontal axes and being adapted to travel along the beams of an excavator boom; a guide roller on each equalizing roller carrier and rotatable on a vertical axis which intersects the horizontal axis of the equalizing roller carrier; a second guide roller on each rear roller carrier slightly forward of the rear roller and also rotatable on a vertical axis; both guide rollers being so constructed and arranged that they contact with the boom to transmit side thrusts and reactions on the scoop to the boom.

3. In combination with a skimmer scoop and boom-supported carrying structure therefor which is rigidly fixed to the scoop and extends above the same, a plurality of lateral guide rollers adapted to bear against the boom at points well spaced apart longitudinally of the scoop, said guide rollers being mounted on said scoop-carrying structure and projecting inwardly toward the boom farther than any other parts of said scoop-carrying structure so as to make first contact with said boom responsive to any component of force moving or tending to move the scoop sidewise in either direction.

4. In combination with a boom having spaced vertical webs, a skimmer scoop and a carrying structure fixed to the scoop and adapted to travel along the boom, a plurality of lateral guide rollers mounted on said carrying structure on each side of the boom and each being rotatable on fixed transverse axes which are parallel to the vertical webs of the boom; the peripheries of said lateral guide rollers being substantially in contact with said webs.

ROBERT REX DOWNIE.